(12) United States Patent
Ewing

(10) Patent No.: US 7,529,753 B1
(45) Date of Patent: May 5, 2009

(54) PROVIDING APPLICATION-LAYER FUNCTIONALITY BETWEEN ONE OR MORE DATABASE CLIENTS AND ONE OR MORE DATABASE SERVERS

(75) Inventor: David B. Ewing, Huntsville, AL (US)

(73) Assignee: Crossroads Systems, Inc., Austin, TX (US)

( * ) Notice: Subject to any disclaimer, the term of this patent is extended or adjusted under 35 U.S.C. 154(b) by 367 days.

(21) Appl. No.: 10/933,790

(22) Filed: Sep. 3, 2004

(51) Int. Cl.
*G06F 17/30* (2006.01)

(52) U.S. Cl. ............... 707/10; 707/4; 707/5; 709/203; 709/219

(58) Field of Classification Search ............ 707/100, 707/104.1, 103 X, 103 R, 1; 709/224, 225
See application file for complete search history.

(56) References Cited

U.S. PATENT DOCUMENTS

| | | | |
|---|---|---|---|
| 5,317,742 A | 5/1994 | Bapat | |
| 5,828,901 A | 10/1998 | O'Toole et al. | |
| 5,915,249 A | 6/1999 | Spencer | |
| 6,006,214 A | 12/1999 | Carey et al. ............. | 707/2 |
| 6,216,128 B1 | 4/2001 | Di-Crescenzo et al. | |
| 6,272,501 B1 | 8/2001 | Baumann | |
| 6,304,867 B1 | 10/2001 | Schmidt ............. | 707/2 |
| 6,356,887 B1 | 3/2002 | Berenson et al. | |
| 6,381,632 B1 | 4/2002 | Lowell | |
| 6,574,635 B2 | 6/2003 | Stauber et al. | |
| 6,629,132 B1 | 9/2003 | Ganguly et al. | |
| 6,633,923 B1 | 10/2003 | Kukura et al. | |
| 6,714,905 B1 | 3/2004 | Chang et al. | |
| 6,728,748 B1 | 4/2004 | Mangipudi et al. | |
| 6,732,186 B1 | 5/2004 | Hebert | |
| 6,735,636 B1 | 5/2004 | Mokryn et al. | |
| 6,772,411 B2 | 8/2004 | Hayes et al. | |
| 6,779,002 B1 | 8/2004 | Mwaura | |

(Continued)

FOREIGN PATENT DOCUMENTS

CA    2 390 954    6/2002

(Continued)

OTHER PUBLICATIONS

Rhea et al, Value-Based Web Caching, May 20-24, 2003, ACM Press, pp. 619-628.*

(Continued)

*Primary Examiner*—John Cottingham
*Assistant Examiner*—Viresh R Patel
(74) *Attorney, Agent, or Firm*—Sprinkle IP Law Group

(57) ABSTRACT

One embodiment includes a system providing application-layer functionality between one or more database clients and one or more database servers. The system includes one or more decoders residing at a decoding layer above a network layer. The decoders reside at a first network location between one or more database clients residing at one or more second network locations and one or more database servers residing at one or more third network locations. The decoders receive database messages communicated from the database clients and intended for the database servers and database messages communicated from the database servers and intended for the database clients, decode the database messages, and extract query-language statements from the database messages. The system also includes an application residing at an application layer above the decoding layer. The application resides at the first network location. The application receives and processes query-language statements extracted at the decoders.

41 Claims, 6 Drawing Sheets

U.S. PATENT DOCUMENTS

| | | |
|---|---|---|
| 6,826,557 B1 | 11/2004 | Carter et al. |
| 6,938,258 B1 | 8/2005 | Weinberger et al. |
| 2002/0078263 A1 | 6/2002 | Darling et al. |
| 2002/0116373 A1 | 8/2002 | Nishikawa et al. ............. 707/3 |
| 2002/0116457 A1 | 8/2002 | Eshleman et al. |
| 2002/0147737 A1 | 10/2002 | Todokoro et al. |
| 2002/0152307 A1 | 10/2002 | Doyle et al. |
| 2002/0174214 A1 | 11/2002 | Carl et al. |
| 2003/0005228 A1 | 1/2003 | Wong et al. ................. 711/121 |
| 2003/0033317 A1 | 2/2003 | Ziglin |
| 2003/0110153 A1* | 6/2003 | Shee .............................. 707/1 |
| 2003/0120675 A1 | 6/2003 | Stauber et al. |
| 2003/0126527 A1 | 7/2003 | Kim et al. |
| 2003/0135505 A1* | 7/2003 | Hind et al. ................. 707/100 |
| 2003/0187977 A1 | 10/2003 | Cranor et al. |
| 2003/0208637 A1 | 11/2003 | Hayduk |
| 2004/0006643 A1 | 1/2004 | Dolson et al. |
| 2004/0019612 A1 | 1/2004 | Tyra et al. |
| 2004/0045014 A1 | 3/2004 | Radhakrishnan |
| 2004/0088405 A1* | 5/2004 | Aggarwal ................... 709/224 |
| 2004/0103199 A1 | 5/2004 | Chao et al. |
| 2004/0162901 A1 | 8/2004 | Mangipudi et al. |
| 2004/0174877 A1 | 9/2004 | Masputra et al. |
| 2004/0193656 A1 | 9/2004 | Pizzo et al. |
| 2004/0199638 A1 | 10/2004 | Kaler |
| 2004/0236726 A1 | 11/2004 | Ewing et al. |
| 2005/0021514 A1 | 1/2005 | Barga et al. |
| 2005/0278276 A1* | 12/2005 | Andreev et al. ................ 707/1 |

OTHER PUBLICATIONS

Kossman, The State of the Art in Distributed Query Processing, 2001, ACM Press, vol. 32 Issue 4, pp. 422-469.*
Kaashoek et al, Server Operating Systems, 1996, ACM SIGOPS, pp. 141-148.*
Luo et al, Middle Tier Database Caching for e-Business, Jun. 4-6, 2002, ACM, p. 600-611.*
Kalnis et al, Proxy Server Architecture for OLAP, May 21-24, 2001, ACM, p. 367-378.*
Emrey, DB2 Magazine: Linking Databases and More, Quarter 3, 2003, DB2 Magazine, vol. 8, issue 3.*
North, Benchmark of SQL Query Processing for ODBC and Oracle Call Interface, Oct. 2002, Ken North Computing.*
IBM Corporation, WOW DRDA Supports TCP/IP: DB2 Server for OS/90 and DB2 Universal Database, Jul. 1997, IBM, First Edition, Preface.*
Degenaro et al, A Middleware System Which Intelligently Caches Query Results, 2000, Springer, p. 24-44.*
Hong et al, Webquilt: A Proxy Based Approach to Remote Web Usability Testing, Jul. 2001, ACM, vol. 19, issue 3, p. 263-285.*
Banga et al, Better Operating System Features for Faster Network Servers, Dec. 1998, ACM, vol. 26, Issue 3, pp. 23-30.*
Rhea et al, Value Based Web Caching, May 20-24, 2003, ACM, pp. 619-628.*
Kossman, The State of the Art Distributed Query Processing, 2001, ACM, vol. 32, Issue 4, p. 422-469.*
Kaashoek et al, Server Operating System, 1996, ACM, pp. 141-148.*
Office Action dated Nov. 27, 2007 from U.S. Appl. No. 10/934,887, filed Sep. 3, 2004.
Office Action issued in U.S. Appl. No. 10/933,786, May 7, 2008.
Office Action issued in U.S. Appl. No. 10/934,887, Jun. 3, 2008.
Lempel, "Predictive Caching and Prefetching of Query Results in Search Engines," ACM Press New York, N.Y. USA Proceedings of the 12th International Conference on World Wide We.
Office Action issued in U.S. Appl. No. 10/933,786, Feb. 6, 2007.
Office Action issued in U.S. Appl. No. 10/933,786, Jul. 16, 2007.
Office Action issued in U.S. Appl. No. 10/933,786, Nov. 14, 2007.
Office Action issued in U.S. Appl. No. 10/934,887, Jun. 6, 2007.

* cited by examiner

PROVIDING APPLICATION-LAYER FUNCTIONALITY BETWEEN ONE OR MORE DATABASE CLIENTS AND ONE OR MORE DATABASE SERVERS

TECHNICAL FIELD

This invention relates generally to database systems and more particularly to providing application-layer functionality between one or more database clients and one or more database servers

BACKGROUND

A database server providing access to one or more database instances typically processes large numbers of queries, write messages, and other database messages from clients. Processing large numbers of database messages at the database server tends to slow response time at the database server, which in turn tends to adversely affect service at the database server to clients.

SUMMARY OF THE INVENTION

The present invention may reduce or eliminate disadvantages and problems often associated with database servers.

One embodiment includes a system for application-layer query result caching. The system includes one or more decoders residing at a decoding layer above a network layer. The decoders reside at a first network location between one or more database clients residing at one or more second network locations and one or more database servers residing at one or more third network locations. The decoders receive database messages communicated from the database clients and intended for the database servers and database messages communicated from the database servers and intended for the database clients, decode the database messages, and extract query-language statements from the database messages. The system also includes a caching application residing at an application layer above the decoding layer. The caching application resides at the first network location. The caching application receives query-language statements extracted at the decoders comprising queries, receives query-language statements extracted at the decoders comprising query results corresponding to the queries, and records the queries and the query results corresponding to the queries in a cache residing at the first network location.

Another embodiment includes a system for application-layer monitoring of communication between one or more database clients and one or more database servers. The system includes one or more decoders residing at a decoding layer above a network layer. The decoders reside at a first network location between one or more database clients residing at one or more second network locations and one or more database servers residing at one or more third network locations. The decoders receive database messages communicated from the database clients and intended for the database servers and database messages communicated from the database servers and intended for the database clients, decode the database messages, and extract query-language statements from the database messages. The system also includes a monitoring application residing at an application layer above the decoding layer. The monitoring application resides at the first network location. The monitoring application receives query-language statements extracted at the decoders and records observations on the database messages based on the query-language statements extracted at the decoders.

Yet another embodiment includes a system providing application-layer functionality between one or more database clients and one or more database servers. The system includes one or more decoders residing at a decoding layer above a network layer. The decoders reside at a first network location between one or more database clients residing at one or more second network locations and one or more database servers residing at one or more third network locations. The decoders receive database messages communicated from the database clients and intended for the database servers and database messages communicated from the database servers and intended for the database clients, decode the database messages, and extract query-language statements from the database messages. The system also includes an application residing at an application layer above the decoding layer. The application resides at the first network location. The application receives and processes query-language statements extracted at the decoders.

Particular embodiments of the present invention may provide one or more technical advantages. As an example, particular embodiments may enable application, at a logical or network location between one or more clients and one or more database servers, of application-layer functionality to communication between the clients and the database servers. The application-layer functionality at the logical or network location between the clients and the database servers may reside on top of a layer providing functionality for decoding and extracting SQL or other statements from database messages. Particular embodiments may, at a logical or network location between one or more clients and one or more database servers, cache query results from one or more database servers and respond to queries from one or more clients using cached query results. Responding to queries using cached query results may reduce time requirements associated with responding to such queries. Responding to queries using cached query results may also reduce loads on the database servers, which may in turn improve performance of the database servers. Particular embodiments may enable application-layer monitoring, at a logical or network location between one or more clients and one or more database servers, of communication between clients and database servers.

Particular embodiments of the present invention provide all, some, or none of these technical advantages. Particular embodiments may provide one or more other technical advantages, one or more of which may be readily apparent to a person skilled in the art from the figures, description, and claims herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
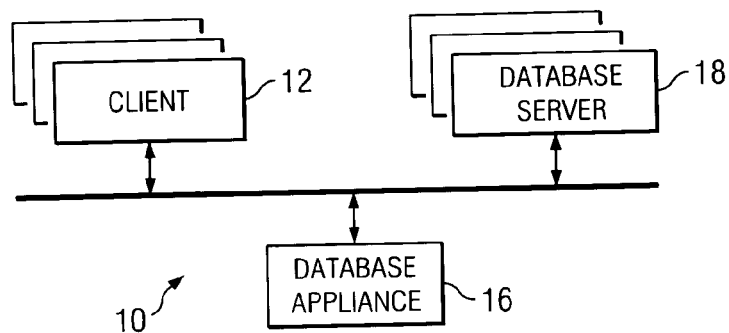
FIG. 1 illustrates an example system including a database appliance.

FIG. 1 illustrates an example system 10 including a database appliance. System 10 includes one or more clients 12 a database appliance 16, and one or more database servers 18. One or more links couple clients 12, database appliance 16, and database servers 18 to each other. In particular embodiments, a link includes one or more wires in one or more circuit boards, one or more internal or external buses, one or more local area networks (LANs), one or more metropolitan area networks (MANs), one or more wide area networks (WANs), one or more portions of the Internet, or a combination of two or more such links. As an example and not by way of limitation, a link coupling two or more components of system 10 to each other may include one or more of an Ethernet link, a Fibre Channel link, an Infiniband link, and a Fiber Distributed Data Interface (FDDI) link. Although particular links are described as coupling components of system 10 to each other, the present invention contemplates any suitable links coupling components of system 10 to each other.

In particular embodiments, one or more components of system 10 are each a stand-alone device. As an example and not by way of limitation, database appliance 16 may be a stand-alone device physically separate from clients 12 and database servers 18. In particular embodiments, a single device includes two or more components of system 10. The two or more components of system 10 in the single device may communicate with each other using Interprocess Communication (IPC). As an example and not by way of limitation, database appliance 16 may be a component of a device including one or more database servers 18 and may communicate with database servers 18 using IPC. As another example, database appliance 16 may be a component of a device including one or more clients 12 and may communicate with clients 12 using IPC.

In particular embodiments, a client 12 includes a hardware, software, or embedded-logic component or a combination of two or more such components that provide one or more users access to one or more of one or more applications at client 12, database appliance 16, and one or more database servers 18. As an example and not by way of limitation, client 12 may receive input from a user at client 12 and, based on the user input, execute an application instance at client 12. The application instance may then return one or more results, and client 12 may communicate to the user output based on the results from the application instance. As another example, client 12 may receive input from a user at client 12 and communicate to one or more database servers 18 a database message (such as, for example, a query, a query result, or a write message) based on the input from the user. Client 12 may then receive a response to the database message from database servers 18 and communicate to the user output based on the response from database servers 18. If client 12 communicates a query to one or more database servers 18, client 12 may receive a response to the query from database appliance 16 instead of database servers 18, as described below. Although a particular client 12 providing particular client functionality is described, the present invention contemplates any suitable client 12 providing any suitable client functionality.

In particular embodiments, a client 12 includes one or more application servers that each include a hardware, software, or embedded-logic component or a combination of two or more such components that host one or more applications, such as one or more business applications. As an example and not by way of limitation, an application server may receive a request to access an application hosted at the application server and, in response to the request, generate an instance of the application. The application server may then communicate the application instance for execution or execute the application instance and communicate one or more results of execution of the application instance for processing. Although a particular application server providing particular application-server functionality is described, the present invention contemplates any suitable application server providing any suitable application-server functionality. Client 12 and the applications servers may be physically separate from each other. A single device may include client 12 and the application servers.

In particular embodiments, database appliance 16 includes a hardware, software, or embedded-logic component or a combination of two or more such components that process Structured Query Language (SQL) statements communicated between clients 12 and database servers 18 and, based on such processing, provide caching, monitoring, or other functionality or a combination of such functionality at an application layer of a protocol stack, as described below. Although particular statements communicated between clients 12 and database servers 18 are described, the present invention contemplates database appliance 16 processing any suitable statements communicated between clients 12 and database servers 18. In particular embodiments, a rack server having a height of approximately one height unit (U) houses database appliance 16.

In particular embodiments, one or more clients 12 and one or more database servers 18 communicate with each other through database appliance 16. In such embodiments, database appliance 16 may be a proxy for a database server 18 and receive a database message from a client 12 intended for database server 18. In particular embodiments, database appliance 16 then processes the database message (which may include recording one or more observations on the database message) and communicates the database message to database server 18, as described below. In particular embodiments, database appliance 16 then processes the database message (which may include attempting to match the database message to a cache entry at database appliance 16, creating a cache entry based on contents of the database message, or both) and, according to results of such processing, either communicates the database message to database server 18 or communicate a response to the database messages to client 12 without communicating the database message to database server 18, as described below. In particular embodiments, one or more clients 12 and one or more database servers 18 do not communicate with each other through database appliance 16, but communicate with each other directly. In such embodiments, database appliance 16 may passively monitor communication between clients 12 and database servers 18, as described below.

In particular embodiments, to provide fault tolerance at database appliance 16, database appliance 16 includes two or more database appliances 16. As an example and not by way of limitation, system 10 may include a first database appliance 16 and a second database appliance 16 that share a virtual IP address with each other. To clients 12 and database servers 18 in system 10, first and second database appliances 16 may appear to be a single component. First database appliance 16 may have a primary role with respect to second database appliance 16, and second database appliance 16 may have a secondary role with respect to first database appliance 16. First database appliance 16 may process SQL statements communicated between clients 12 and database servers 18 and, based on such processing, provide caching, monitoring, or other functionality or a combination of such functionality. Second database appliance 16 may monitor first database appliance 16 and, if a failure occurs at first database appliance 16, automatically take over and, in place of first database appliance 16, process SQL statements communicated between clients 12 and database servers 18 and, based on such processing, provide caching, monitoring, or other functionality or a combination of such functionality. In particular embodiments, first database appliance 16 may copy data at first database appliance 16 over to second database appliance 16 so that, if a failure occurs at first database appliance 16 and second database appliance 16 takes over, second database appliance 16 may use such data when second database appliance takes over. First database appliance 16 may copy such data over to second database appliance 16 periodically or in response to particular events.

In particular embodiments, a database server 18 includes a hardware, software, or embedded-logic component or a combination of two or more such components that provide one or more clients 12 access to one or more database instances. As an example and not by way of limitation, a database server 18 may receive a query from a client 12 and, in response to the query, access data in one or more database instances responsive to the query and communicate the data to the client 12. Client 12 may, but need not, communicate the query to database server 18 in one or more acknowledged message exchange sequences. In addition, database server 18 may, but need not, communicate the data to the client in one or more acknowledged message exchange sequences. As another example, a database server 18 may receive a write message from a client 12 and, in response to the write message, make one or more changes to one or more database instances. As an example and not by way of limitation, in response to the write message, database server 18 may make one or more changes to one or more existing rows in one or more tables in or more database instances, add one or more rows to one or more tables in or more database instances, remove one or more rows from one or more tables in or more database instances, change one or more table definitions of one or more tables in or more database instances, change one or more views referencing one or more tables in or more database instances, remove one or more tables from or more database instances, or make one or more other changes to one or more database instances. A write message may, but need not, include a call to a procedure stored at database server 18.

In particular embodiments, database server 18 includes a cluster of multiple devices that each include one or more hardware, software, or embedded-logic components or a combination of two or more such components. In particular embodiments, database server 18 includes a mainframe computing system. Two or more database servers 18 in system 10 may, but need not, provide access to database instances that have database implementations different from each other. As an example and not by way of limitation, system 10 may include a first database server 18, a second database server 18, and a third database server 18. First database server 18 may provide access to a first database instance implemented according to Distributed Relational Database Architecture (DRDA), second database server 18 may provide access to a second database instance implemented according to Tabular Data Stream (TDS), and third database server 18 may provide access to a third database instance implemented according to OracleNet. A single database server 18 in system 10 may provide access to multiple database instances, and two or more of the database instances may, but need not, have database implementations different from each other. As an example and not by way of limitation, a single database server 18 may provide access to a first database instance implemented according to DRDA, a second database instance implemented according to TDS, and a third database instance implemented according to OracleNet. Although particular database implementations are described, the present invention contemplates any suitable database implementations.

In particular embodiments, clients 12 communicate with database server 18 at an application layer using SQL. The present invention contemplates any suitable dialect of SQL or other query language. Examples of dialects include, but are not limited too, T-SQL, XQUERY, SQL, SQL92, SQL99, SQL2003, and other dialects. Although particular dialects of particular query languages are described, the present invention contemplates any suitable dialects of any suitable query languages. Although SQL is described, the present invention contemplates clients 12 and database server 18 communicating with each other at an application layer using any suitable language.

In particular embodiments, clients 12 communicate with database server 18 at a driver layer below an application layer using a DRDA protocol, a TDS protocol, an OracleNet protocol, another protocol, or a combination of two or more such protocols. Although particular protocols are described, the present invention contemplates clients 12 and database server 18 communicating with each other at a driver layer below an application layer using any suitable protocol.

Figure 2:
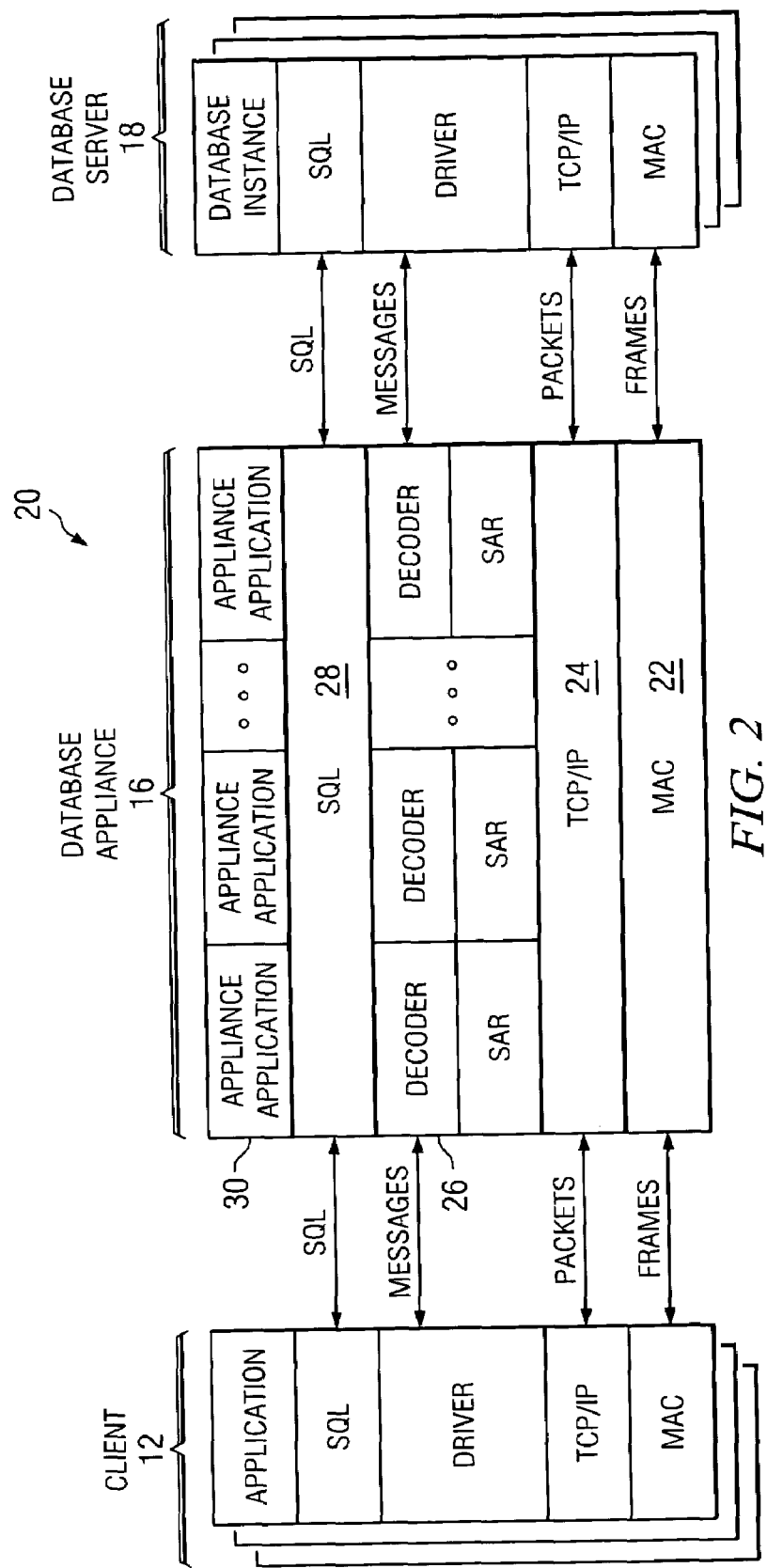
FIG. 2 illustrates an example protocol stack at an example database appliance.

FIG. 2 illustrates an example protocol stack 20 at database appliance 16. In particular embodiments, a protocol stack includes multiple protocols at multiple layers each providing a particular functionality. Protocol stack 20 at database appliance 16 includes a media access control (MAC) layer 22, a TCP/IP layer 24, a decoder layer 26, an SQL layer 28, and an application layer 30. MAC layer 22 at database appliance 16 receives frames from MAC layers 22 at clients 12 and database servers 18, assembles packets from the frames, and communicates the packets to TCP/IP layer 24 at database appliance 16. MAC layer 22 at database appliance 16 also accesses frames written to memory in database appliance 16 and communicates the accessed frames to MAC layers at clients 12 and database servers 18. TCP/IP layer 24 at database appliance 16 receives packets from MAC layer 22 at database appliance 16, extracts database messages from the received packets, and communicates the extracted database messages to decoder layer 26 at database appliance 16.

Decoder layer 26 at database appliance 16 receives database messages from TCP/IP layer at database appliance 16, decodes and extracts SQL statements from the database messages, and communicates the extracted SQL statements to SQL layer 28 at database appliance 16. Decoder layer 26 includes one or more decoders that each decode and extract SQL statements from particular database messages. As an example and not by way of limitation, decoder layer 26 may include a first decoder, a second decoder, and a third decoder. The first decoder may decode and extract SQL statements from DRDA database messages, the second decoder may decode and extract SQL statements from TDS database messages, and the third decoder may decode and extract SQL statements from OracleNet database messages. Although particular decoders decoding and extracting SQL statements from particular database messages are described, the present invention contemplates any suitable decoders decoding and extracting SQL statements from any suitable database messages. In particular embodiments, one or more decoders in decoder layer 26 each include a segmentation and reassembly (SAR) unit.

In particular embodiments, SQL layer 28 at database appliance 16 receives SQL statements from decoder layer 26 at database appliance 16, normalizes and parses the SQL statements, and communicates the parsed, normalized SQL statements to application layer 30 at database appliance 16 for application-layer processing. Application layer 30 receives parsed, normalized SQL statements from SQL layer 28 at database appliance 16 and processes the parsed, normalized SQL statements according to an application at application layer 30. Application layer 30 includes one or more applications that each provide particular application-layer functionality. As an example and not by way of limitation, application layer 30 may include an application that caches query results from database servers 18 and uses cached query results to respond to queries from clients 12, as described below. As another example, application layer 30 may include an application that monitors and records communication between clients 12 and database servers 18, as described below. Although particular applications at application layer 30 providing particular query-language based functionality are described, the present invention contemplates any suitable application at application layer 30 providing any suitable query-language based functionality.

Figure 3:
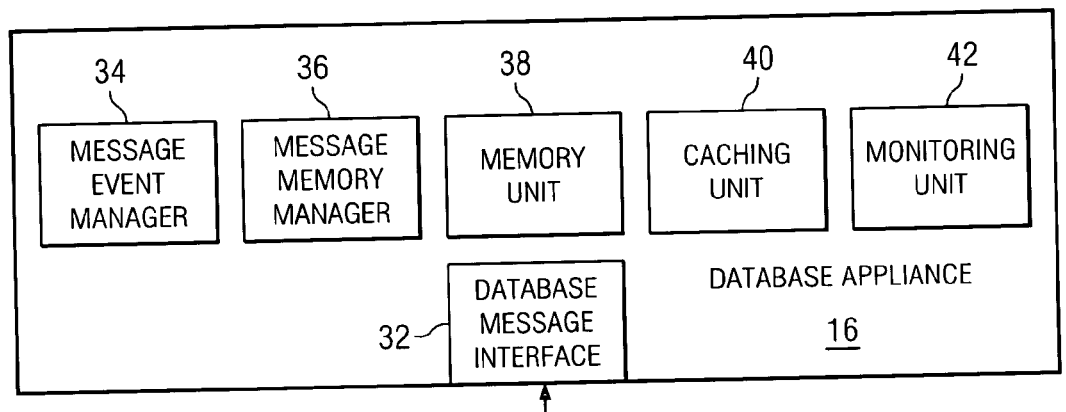
FIG. 3 illustrates an example database appliance.

FIG. 3 illustrates an example database appliance 16. Database appliance 16 includes a database message interface 32, a message event manager 34, a message memory manager 36, a memory unit 38, a caching unit 40, and a monitoring unit 42. In particular embodiments, one or more wires in one or more circuit boards, one or more internal or external buses, one or more local area networks (LANs), one or more metropolitan area networks (MANs), one or more wide area networks (WANs), one or more portions of the Internet, or a combination of two or more such links couple components of database appliance 16 to each other. In particular embodiments, two or more components of database appliance 16 are logically separate from each other. In particular embodiments, two or more components of database appliance 16 share a hardware, software, or embedded logic component or a combination of two or more such components with each other.

Database message interface 32 includes a hardware, software, or embedded logic component or a combination of two or more such components that provide an interface between database appliance 16 and other components of system 10. In particular embodiments, database message interface 32 is a network interface (such as a TCP/IP interface). In particular embodiments, database message interface 32 is an IPC interface. In particular embodiments, database message interface 32 is a passive interface that enables database appliance 16 to monitor database messages between one or more clients 12 and one or more database servers 18 over one or more links, without reconfiguring clients 12 or database servers 18. In such embodiments, a mirrored port on a network switch on a link between a client 12 and a database server 18 may copy database messages between client 12 and database server 18 to database message interface 32.

In particular embodiments, database message interface 32 is a proxy for one or more database servers 18. In such embodiments, a network switch on a link between a client 12 and a database server 18 may redirect to database message interface 32 database messages from client 12 intended for database server 18. Database appliance 16 may process the redirected database messages, and database message interface 32 may or may not then forward the database messages to database server 18, as described below. The network switch may also redirect to database message interface 32 database messages from database server 18 intended for client 12. Database appliance 16 may process the redirected database messages, and database message interface 32 may then forward the database messages to client 12, as described below. In particular embodiments, database message interface 32 has two modes: a passive mode and a proxy mode. In such embodiments, a user may switch database message interface 32 from passive mode to proxy mode and vice versa. When in passive mode, database message interface 32 is a passive interface, as described above. When in proxy mode, database message interface 32 is a proxy for one or more database servers 18, as described above. In particular embodiments, passive mode enables database appliance 16 to project speedup of query response time in proxy mode and build cache 44 for responding to queries in proxy mode, as described below.

In particular embodiments, when database message interface 32 receives a database message from a client 12 or a database server 18, database message interface 32 notifies message event manager 34 that database message interface 32 received the database message. Message event manager 34 then invokes message memory manager 36 to write the database message to memory unit 38. Memory unit 38 may include volatile memory, nonvolatile memory, or both. In particular embodiments, to communicate a database message from memory unit 38 to a client 12 or a database server 18, database message interface 32 uses direct memory access (DMA) to access one or more frames of the database message in memory unit 38 according to a buffer pointing to the frames in memory unit 38. Database appliance 16 need not generate or reassemble the frames to communicate the database message to client 12 or database server 18, which may reduce clock-cycle requirements and other resource utilization associated with communicating database messages from memory unit 38 to client 12 or database server 18.

Message event manager 34 includes a hardware, software, or embedded logic component or a combination of two or more such components that process message events at database appliance 16. In particular embodiments, message event manager 34 processes message events from an event queue (which may be a first in, first out, (FIFO) queue) as described below. Example message events include, but are not limited to, database message interface 32 receiving a database message from a client 12 or a database server 18, data becoming available for processing at one or more components of database appliance 16, data becoming ready for communication from database appliance 16 to a client 12 or a database server 18, database appliance 16 establishing a new connection to a client 12 or a database server 18, database appliance 16 taking down a connection to a client 12 or a database server 18, and other message events. Although particular message event are described, the present invention contemplates any suitable message events. When a message event occurs at database appliance 16, database appliance 16 adds the message event to the event queue for processing. As an example and not by way of limitation, when database message interface 32 receives a database message from a client 12 or a database server 18, database message interface 32 may add an entry to the event queue corresponding to receipt of the database message. Message event manager 34 may pull the entry from the event queue and, in response to receipt of the database message, cause message memory manager 36 to write the database message to memory unit 38.

Message event manager 34 uses a single nonblocking, event-driven control thread to process message events at database appliance 16. In particular embodiments, when database appliance 16 powers up, message event manager 34 instantiates the control thread, which then accesses the event queue. If the event queue includes one or more message events, the control thread accesses a message event at a front of the event queue and starts to process the message event. If the event queue does not include a message event, the control thread waits until the event queue receives a message event to process, at which point the control thread accesses and starts to process the message event. If the control thread finishes processing a first message event, the control thread accesses the event queue to pull a second message event from the event queue for processing. If, while processing a first message event, the control thread reaches a point at which the control thread requires currently unavailable data from one or more components of database appliance 16 to continue processing the message event, the control thread instructs one or more of the components to notify message event manager 34 when the required data becomes available. The control thread then accesses the event queue to pull a second message event from the event queue for processing. When the required data becomes available, the one or more components instructed to notify message event manager 34 add an entry to the event queue indicating that the required data is available. When the control thread accesses the event queue and the entry indicating that the required data is available is at a front of the event queue, the control thread resumes processing the first message event. If, while processing a first message event, the control thread reaches a point at which the control thread requires one or more components of database appliance 16 to execute one or more tasks to continue processing the message event, the control thread instructs one or more of the components to notify message event manager 34 when the required tasks are complete. The control thread then accesses the event queue to pull a second message event from the event queue for processing. When the required tasks are complete, the components instructed to notify message event manager 34 add an entry to the event queue indicating that the required tasks are complete. When the control thread accesses the event queue and the entry indicating that the required tasks are complete is at a front of the event queue, the control thread resumes processing the first message event.

In particular embodiments, to process a message event, the control thread communicates a call to a component (such as, for example, database message interface 32, message memory manager 36, caching unit 40, or monitoring unit 42) of database appliance 16 to invoke the component. In particular embodiments, to process a new connection established between database appliance 16 and a client 12 or a database server 18, the control thread instantiates a session object (such as, for example, a C++ object or a JAVA object) for the new connection. In particular embodiments, to process a database message received at database appliance 16 from a client 12 or a database server 18, the control thread similarly instantiates a session object for the database message. The control thread may concurrently manage multiple session objects. Message event manager 34 uses network interfaces that invoke callback methods on session objects, instead of network interfaces that block or otherwise wait for completion of network or other operations. In particular embodiments, network events such as data available, ready to send, new connection, and connection closed propagate through relevant session objects for database-protocol processing.

In contrast to particular embodiments, traditional database-protocol processing requires a control thread directing communication of one or more frames to hold, before resuming processing, until transmission and receipt of the frames are complete. Because of such requirement, processing multiple, concurrent database sessions according to a traditional database protocol requires use of multiple, concurrent control threads, which in turn requires mechanisms (such as, for example, semaphores or locks) for protecting shared data structures from corruption resulting from unsynchronized access. Putting into place and releasing such mechanisms to protect and access such data structures as needed increases clock-cycle and memory requirements and other resource utilization associated with processing multiple, concurrent database sessions. In particular embodiments, using a single nonblocking, event-driven control thread to process message events at database appliance 16 obviates such mechanisms for processing multiple, concurrent database sessions, which in turn reduces clock-cycle and memory requirements and other resource utilization associated with processing multiple, concurrent database sessions.

Message memory manager 36 includes a hardware, software, or embedded logic component or a combination of two or more such components that allocate memory in memory unit 38 for storing database messages and manage access to database messages in memory unit 38. In particular embodiments, when database message interface 32 receives a database message from a client 12 or a database server 18, database message interface 32 notifies message event manager 34 that database message interface 32 received the database message. Message event manager 34 then invokes message memory manager 36 to write the database message to memory unit 38. One or more frames (such as, for example, Ethernet frames) may include the database message. In particular embodiments, message memory manager 36 writes the frames of the database message to memory unit 38 without assembling the database message. As an example and not by way of limitation, when database message interface 32 receives a frame from a database client 12 or a database server 18, message memory manager 36 may write the frame to memory unit 38 without modifying the frame. Message memory manager 36 may write different portions of the frame to different, separately addressed memory locations in memory unit 38, which need not be contiguous with each other. In particular embodiments, message memory manager 36 also generates a buffer (an abstract data structure) including one or more pointers to one or more memory locations in memory unit 38 to which message memory manager 36 wrote the frame. To process contents of the frame, a first component of database appliance 16 may communicate the buffer—instead of the frame itself—to one or more second components of appliance 16. The first component need not reassemble the frame or copy the frame from one or more first, original memory locations of the frame in memory unit 38 to one or more second memory locations in memory unit 38 or elsewhere. When the first component communicates the buffer to the second components, the second components may then, using message memory manager 36, access the frame in memory unit 38 according to the buffer to process contents of the frame. Such "zero copy" processing may reduce clock-cycle requirements and other resource utilization associated with processing the frame.

Caching unit 40 includes a hardware, software, or embedded logic component or a combination of two or more such components that cache query results from database servers 18 and use cached query results to respond to queries from clients 12, as described below. Monitoring unit 42 includes a hardware, software, or embedded logic component or a combination of two or more such components that collect and record statistics on communication between clients 12 and database servers 18, caching activity at database appliance 16, or both, as described below.

Figure 4:
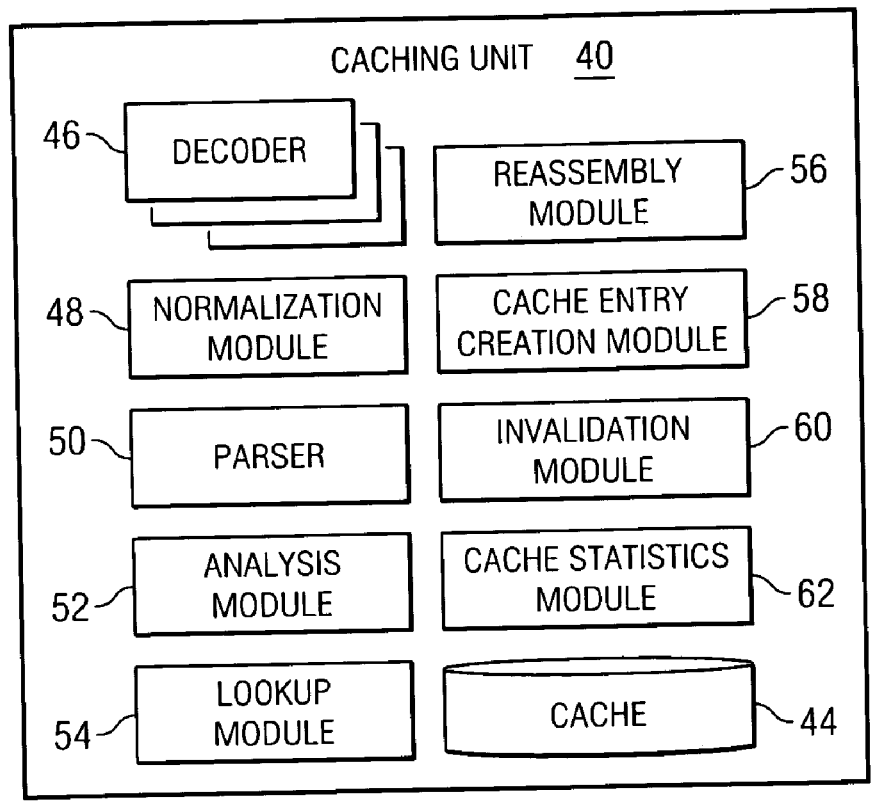
FIG. 4 illustrates an example caching unit of the database appliance.

FIG. 4 illustrates an example caching unit 40 of database appliance 16. Caching unit 40 includes a cache 44, multiple decoders 46, a normalization module 48, a parser 50, an analysis module 52, a lookup module 54, a reassembly module 56, a cache entry creation module 58, an invalidation module 60, and a cache statistics module 62. In particular embodiments, a wire in one or more circuit boards, an internal or external bus, a local area network (LAN), a metropolitan area network (MAN), a wide area network (WAN), a portion of the Internet, or other link or a combination of two or more such links couple components of caching unit 40 to each other. In particular embodiments, two or more components of caching unit 40 are logically separate from each other. In particular embodiments, two or more components of caching unit 40 share a hardware, software, or embedded logic component or a combination of two or more such components with each other.

Cache 44 includes records of query results. Cache 44 may be volatile or nonvolatile. In particular embodiments, a record (or cache entry) in cache 44 includes a discriminator that uniquely identifies the record. The record also includes one or more buffers pointing to one or more memory locations in memory unit 38 that include one or more frames of one or more database messages including one or more query results responsive to a query. The record need not include the frames of the database messages or the query results themselves, and cache entry creation module 58 need not assemble or format the query results to create the record. In particular embodiments, the record also identifies a database instance and a table from which each of the query results originated. In particular embodiments, the record also indicates a date and time when the record was created and dates and times when the record was accessed. In particular embodiments, the record also identifies users who have accessed the record and indicates, for each of the users, a number of times the user has accessed the record and dates and times when the user accessed the record. In particular embodiments, cache 44 includes a map of records in cache 44 for fast lookup of such records. The map may include a red/black search tree or other search tree including discriminators identifying records in cache 44. Lookup module 54 may use the map to look up cache entries, as described below.

A decoder 46 includes a hardware, software, or embedded logic component or a combination of two or more such components that decode and extract SQL statements from database messages. In particular embodiments, a decoder 46 resides on top of a TCP/IP layer of a protocol stack, as described below. Decoders 46 each decode and extract SQL statements from particular database messages. As an example and not by way of limitation, caching unit 40 may include a first decoder 46, a second decoder 46, and a third decoder 46. First decoder 46 may decode and extract SQL statements from DRDA database messages, second decoder 46 may decode and extract SQL statements from TDS database messages, and third decoder 46 may decode and extract SQL statements from OracleNet database messages. Although particular decoders 46 decoding and extracting SQL statements from particular database messages are described, the present invention contemplates any suitable decoders 46 decoding and extracting SQL statements from any suitable database messages.

Decoders 46 are event driven and each include an interface (or function point) enabling message event manager 34 to invoke decoder 46. As an example and not by way of limitation, in response to database message interface 32 receiving a database message from a client 12 or a database server 18, message event manager 34 may communicate a call to decoder 46 invoking decoder 46 to decode and extract an SQL statement from the database message. The call may include a buffer pointing to the database message in memory unit 38. The call need not include the database message itself. Decoder 46 may access the database message according to the buffer and then decode the database message, extract an SQL statement from the database message, and communicate the SQL statement to normalization module 48 for normalization. In particular embodiments, decoders 46 include interfaces similar to each other, which may obviate message event manager 34 having multiple interfaces for invoking decoders 46. In such embodiments, message event manager 34 may use a single interface to invoke any one of decoders 46.

In particular embodiments, when database message interface 32 receives a database message, message event manager 36 selects a decoder 46 to decode the database message according to a port on which database message interface 32 received the database message. As an example and not by way of limitation, database appliance 16 may include a first port configured (manually or otherwise) to receive database messages intended for a DRDA database server 18, a second port configured to receive database messages intended for a TDS database server 18, and a third port configured to receive database messages intended for an OracleNet database server 18. When database message interface 32 receives a database message on the first port, message event manager 36 may invoke a DRDA decoder 46 to decode and extract an SQL statement from the database message. When database message interface 32 receives a database message on the second port, message event manager 36 may invoke a TDS decoder 46 to decode and extract an SQL statement from the database message. When database message interface 32 receives a database message on the third port, message event manager 36 may invoke an OracleNet decoder 46 to decode and extract an SQL statement from the database message.

In particular embodiments, when database message interface 32 receives a database message, message event manager 36 selects a decoder 46 to decode the database message according to contents of the database message. As an example and not by way of limitation, database message interface 32 may receive a database message from a client 12 or a database server 18. Message event manager 34 may read contents of the database message to determine whether the database message is a DRDA database message, a TDS database message, or an OracleNet database message. If message event manager 34 determines that the database message is a DRDA database message, message event manager 36 may invoke a DRDA decoder 46 to decode and extract an SQL statement from the database message. If message event manager 34 determines that the database message is a TDS database message, message event manager 36 may invoke a TDS decoder 46 to decode and extract an SQL statement from the database message. If message event manager 34 determines that the database message is an OracleNet database message, message event manager 36 may invoke an OracleNet decoder 46 to decode and extract an SQL statement from the database message.

Normalization module 48 includes a hardware, software, or embedded logic component or a combination of two or more such components that normalize SQL statements. Normalization of two SQL statements facilitates determination of equivalency between the two SQL statements. As an example and not by way of limitation, a decoder 46 may extract an SQL statement from a query and communicate the SQL statement to normalization module 48. Normalization module 48 may then normalize the SQL statement. Lookup module 54 may compare the normalized SQL statement with normalized query text identifying records in cache 44 and, if the normalized SQL statement is equivalent to normalized query text identifying a cache entry, determine that the cache entry includes one or more query results responsive to the query. In particular embodiments, to normalize an SQL statement, normalization module 48 capitalizes all letters in the SQL statement. In particular embodiments, to normalize an SQL statement, normalization module 48 reorders terms in the SQL according to a predetermined order. In particular embodiments, to normalize an SQL statement, normalization module 48 modifies one or more clauses in the SQL statement according to a predetermined clause equivalency. Although particular normalization of SQL statements is described, the present invention contemplates any suitable normalization of SQL statements.

Parser 50 includes a hardware, software, or embedded logic component or a combination of two or more such components that parse SQL statements. As an example and not by way of limitation, normalization module 48 may normalize an SQL statement and communicate the SQL statement to parser 50. Parser 50 may parse the SQL statement. In particular embodiments, to parse an SQL statement, parser 50 includes a left-to-right and rightmost derivation (LR) parser. In such embodiments, to parse an SQL statement, parser 50 may use predetermined state tables derived from a specified SQL grammar. Multiple state tables may be available to parser 50, and each of the state tables may support a particular dialect of SQL. Parser 50 may select a state table for parsing an SQL statement according to a database implementation (such as DRDA, TDS, or OracleNet) of an intended database instance. Although particular parsing of particular SQL statements is described, the present invention contemplates any suitable parsing of any suitable SQL statements.

Analysis module 52 includes a hardware, software, or embedded logic component or a combination of two or more such components that analyze SQL statements. Caching unit 40 may process an SQL statement according to one or more results of analysis of the SQL statement at analysis module 52. In particular embodiments, analysis module 52 analyzes an SQL statement to determine whether the SQL statement includes a query, a query result, or a write message. In particular embodiments, analysis module 52 analyzes an SQL statement to identify a database server 18, a database instance, a table in the database instance, a client 12, a user, or a combination of two or more of the preceding. As an example and not by way of limitation, parser 50 may communicate a parsed, normalized SQL statement including a query to analysis module 52. Analysis module 52 may analyze the SQL statement and, from the analysis, determine that the SQL statement includes a query. From the analysis, analysis module 52 may also identify an intended database server 18, an intended database instance, and an intended table in the database instance. From the analysis, analysis module 52 may also identify a user who generated and a client 12 that communicated the query. Because the SQL statement includes a query, analysis module 52 may communicate the SQL statement (and possibly one or more results of the analysis of the SQL statement) to lookup module 54 for lookup. If an administrator of database appliance 16 has disabled (or not enabled) database appliance 16 responding to queries according to cached query results with respect to intended database server 18, the intended database instance, the intended table in the database instance, the user who generated the query, or client 12 that communicated the query, analysis module 52 may withhold the SQL statement from Lookup module 54 so that database appliance 16 does not communicate a response to client 12 according to one or more cached query results.

As another example, parser 50 may communicate a parsed, normalized SQL statement including a query result to analysis module 52. Analysis module 52 may analyze the SQL statement and, from the analysis, determine that the SQL statement includes a query result. From the analysis, analysis module 52 may also identify an intended user and an intended client 12. From the analysis, analysis module 52 may also identify a database server 18 that communicated the query result and a database instance and a table in the database instance that included the query result. In particular embodiments, because the SQL statement includes a query result, analysis module 52 communicates to reassembly module 56 a buffer pointing to a database message in memory unit 38 including the query result. Reassembly module 56 may then cause database message interface 32 to communicate the database message including the query result from memory unit 38 to a client 12. In particular embodiments, because the SQL statement includes a query result, analysis module 52 communicates the SQL statement (and possibly one or more results of the analysis of the SQL statement) to cache entry creation module 58 for creation of a cache entry. If an administrator of database appliance 16 has disabled (or not enabled) database appliance 16 caching query results with respect to database server 18 that communicated the query result, the database instance that included the query result, the table in the database instance that included the query result, intended client 12, or the intended user, analysis module 52 may withhold the SQL statement from cache entry creation module 58 so that database appliance 16 does not cache the query result.

As yet another example, parser 50 may communicate a parsed, normalized SQL statement including a write message to analysis module 52. Analysis module 52 may analyze the SQL statement and, from the analysis, determine that the SQL statement includes a write message. From the analysis, analysis module 52 may also identify an intended database server 18, an intended database instance, and an intended table in the database instance. From the analysis, analysis module 52 may also identify a user who generated and a client 12 that communicated the write message. Because the SQL statement includes a write message, analysis module 52 may communicate the SQL statement (and possibly one or more results of the analysis of the SQL statement) to invalidation module 60 for invalidation of one or more cache entries.

Lookup module 54 includes a hardware, software, or embedded logic component or a combination of two or more such components that lookup cached query results. As an example and not by way of limitation, analysis module 52 may communicate a normalized, parsed SQL statement including a query to lookup module 54. Lookup module 54 may then use the normalized, parsed SQL statement to determine whether a record in cache 44 includes one or more query results responsive to the query. If a record includes one or more query results responsive to the query, lookup module 54 may communicate to reassembly module 56 a buffer pointing to one or more database messages in memory unit 38 that, according to the cache entry, include one or more query results responsive to the query. Reassembly module 56 may then cause database message interface 32 to communicate the database message from memory unit 38 to a client 12. If a record does not include a valid response to the query, lookup module 54 may communicate the query to cache entry creation module 58 for creation of a cache entry. Lookup module 54 may also communicate to reassembly module 56 a buffer pointing to a database message including the query. Reassembly module 56 may then cause database message interface 32 to communicate the database message from memory unit 38 to a database server 18. To look up cached query results, lookup module 54 may access a mapping (which may include a red/black search tree or other tree data structure facilitating lookup) of discriminators identifying records in cache 44 and compare the discriminators with normalized, parsed SQL statements including queries.

In particular embodiments, if lookup module 54 receives a normalized, parsed SQL statement including a query and cache 44 does not include a record fully responsive to the query, but includes a record partially responsive to the query, lookup module 54 may communicate to reassembly module 56 a buffer pointing to one or more database messages in memory unit 38 that, according to the cache entry, include one or more query results partially responsive to the query. As an example and not by way of limitation, the query may request all data from all fields in rows one through 1000 in a table and the record in cache 44 may include query results including only data from fields in rows one through 100 in the table. In response to the buffer from lookup module 54, reassembly module 56 may cause database message interface 32 to communicate the database messages including the partially responsive query results from memory unit 38 to a client 12. Lookup module 54 may also communicate to reassembly module 56 a buffer pointing to a database message including the query. Reassembly module 56 may then cause database message interface 32 to communicate the database message including the query from memory unit 38 to a database server 18.

Caching unit 40 may subsequently receive one or more database messages communicated from database server 18 including one or more query results responsive to the query. As an example and not by way of limitation, caching unit 40 may subsequently receive database messages communicated from database server 18 including query results including all data from all fields in rows one through 1000 in the table, instead of just data from fields in rows one through 100 in the table. In response to caching unit 40 receiving database messages communicated from database server 18 including query results responsive to the query, caching unit 40 may cause database message interface 32 to communicate from memory unit 38 database messages communicated from database server 18 that include query results responsive to the query and not previously communicated from cache 44 to client 12. Caching unit 40 may also cause memory unit 38 to discard any database messages communicated from database server 18 that include query results responsive to the query and previously communicated from cache 44 to client 12. Caching unit 40 may also add one or more of the query results in the database messages communicated from database server 18 to the record partially responsive to the query.

Reassembly module 56 includes a hardware, software, or embedded logic component or a combination of two or more such components that direct communication of cached query results from database appliance 16 to clients 12 and direct communication of queries received at database appliance 16 to database servers 18. As an example and not by way of limitation, lookup module 54 may communicate to reassembly module 56 a buffer pointing to one or more database messages in memory unit 38 including one or more query results responsive to a query received at database appliance 16 from a client 12. Reassembly module 56 may direct database message interface 32 to access the database messages according to the buffer, and database message interface 32 may then access the database messages using DMA and communicate the database messages to client 12. Neither reassembly module 56 nor database message interface 32 need compound or format the database messages to communicate the database messages to client 12. As another example, lookup module 54 may communicate to reassembly module 56 a buffer pointing to a database message in memory unit 38 including a query to which no cache entries are responsive. Reassembly module 56 may direct database message interface 32 to access the database message according to the buffer, and database message interface 32 may then access the database message using DMA and communicate the database message to a database server 18. Neither reassembly module 56 nor database message interface 32 need compound or format the database message to communicate the database messages to database server 18.

Cache entry creation module 58 includes a hardware, software, or embedded logic component or a combination of two or more such components that create and maintain records of query results in cache 44. As described above, a record in cache 44 includes a discriminator that uniquely identifies the record and one or more buffers pointing to one or more memory locations in memory unit 38 that include one or more frames of one or more database messages including one or more query results responsive to a query. In particular embodiments, to create a record in cache 44, cache entry module 58 allocates memory in cache 44 for the record, generates a discriminator for the record, writes the discriminator and one or more buffers to the record, and adds a timestamp to the record indicating when cache entry creation module 58 created the record. As an example and not by way of limitation, lookup module 54 may communicate to cache entry creation module 58 a parsed, normalized SQL statement including a query. Cache entry creation module 58 may then allocate memory for a record of query results responsive to the query. Cache entry creation module 58 may then generate a discriminator uniquely identifying the record. In particular embodiments, the discriminator includes normalized text from the query, identifies a user who generated the query, and indicates one or more environment-variable settings influencing one or more query results in the record. Cache creation module 54 may hash the discriminator to facilitate fast lookup of the cache entry. Cache entry creation module 58 may then add the discriminator to a mapping (such as, for example, a red/black search tree or other search tree) facilitating fast lookup of the cache entry. Cache entry creation module 58 may also add a timestamp to the record indicating when cache entry creation module 58 created the record. Later, analysis module 40 may communicate to cache entry creation module 58 a buffer pointing to a database message in memory unit 38 including a query result responsive to the query and one or more results (such as an intended user, an intended client 12, a database server 18 that communicated the query result, and a database instance and a table in the database instance from which the query result originated) of an analysis of a parsed, normalized SQL statement including the query result. Cache entry creation module 58 may then write the buffer and the results of the analysis of the SQL statement to the record.

In particular embodiments, to maintain the record in cache 44, cache entry creation module 58 adds to the record additional buffers pointing to additional database messages responsive to the query and records users who access the record, when each of the users accesses the record, and a number of times each user accesses the record.

Invalidation module 60 includes a hardware, software, or embedded logic component or a combination of two or more such components that invalidate entries in cache 44, delete entries in cache 44 to free up memory in cache 44, or both, according to particular needs. In particular embodiments, invalidation module 60 invalidates cache entries based on write messages. As an example and not by way of limitation, invalidation module 60 may receive from analysis module 52 a normalized, parsed SQL statement including a write message intended for a table in a database instance. Invalidation module 60 may also receive from analysis module 52 identification of the table in the database instance. Invalidation module 60 may then access cache 44 and identifies records in cache 44 including query results that originated from the table in the database instance. Invalidation module 60 may invalidate such records. In particular embodiments, to invalidate a cache entry, invalidation module 60 deletes the cache entry. In particular embodiments, to invalidate a cache entry, invalidation module 60 marks the cache entry to indicate that the cache entry is invalid, but does not delete the cache entry. In particular embodiments, invalidation module 60 invalidates cache entries based on aging. As an example and not by way of limitation, if a predetermined amount of time has lapsed since creation of a cache entry, invalidation module 60 may invalidate the cache entry based on the age of the cache entry. In particular embodiments, invalidation module 60 periodically or in response to input from an administrator of database appliance 16 scans cache 44 to identify entries in cache 44 for such invalidation. In particular embodiments, invalidation module 60 invalidates cache entries based on scheduling. As an example and not by way of limitation, invalidation module 60 may invalidate all or some entries in cache 44 according to a predetermined schedule (such as, for example, every day at a particular time or once a week on a particular day at a particular time). In particular embodiments, invalidation module 60 invalidates cache entries based on external triggers. As an example and not by way of limitation, invalidation module 60 may invalidate all or some entries in cache 44 in response to one or more external triggers (such as, for example, input from an administrator or occurrence of a predetermined event). Although particular invalidation of particular cache entries is described, the present invention contemplates any suitable invalidation of any suitable cache entries.

In particular embodiments, invalidation module 60 deletes cache entries in response to utilization of memory in cache 44 reaching a predetermined threshold, in response to utilization of memory in cache 44 preventing creation of new entries in cache 44, or both. In particular embodiments, if utilization of memory in cache 44 reaches a predetermined threshold or prevents creation of a new entry in cache 44, invalidation module 60 selects one or more entries in cache 44 for deletion based on recent usage of entries in cache 44. As an example and not by way of limitation, invalidation module 60 may select one or more least recently used entries in cache 44 for deletion. In particular embodiments, if utilization of memory in cache 44 reaches a predetermined threshold or prevents creation of a new entry in cache 44, invalidation module 60 selects one or more entries in cache 44 for deletion according to one or more cost-based algorithms taking into account observed network client response time and other network-derived factors. Although deletion of particular entries in cache 44 is described, the present invention contemplates deletion of any suitable entries in cache 44.

Cache statistics module 62 includes a hardware, software, or embedded logic component or a combination of two or more such components that collect statistics on caching activity at caching unit 40. In particular embodiments, cache statistics module 62 collects statistics on cache hits at database appliance 16. A cache hit is a cache entry being responsive to a query received at database appliance 16 from a client 12, which may or may not result in communication of a query result from cache 44 to client 12, as described above. As an example and not by way of limitation, cache statistics module 62 may track and record (1) a number of queries from a client 12 intended for a database server 18 and (2) a number of cache hits on the queries. Cache statistics module 62 may compare the two numbers with each other and, from the comparison, determine a percentage of cache hits on queries from client 12 intended for database server 18. Cache statistics module 62 may determine a percentage of cache hits on queries from each of multiple clients 12 intended for each of multiple database servers 18. Cache statistics module 62 may combine two or more such percentages to provide more comprehensive statistics on cache hits at database appliance 16. From historical statistics on cache hits at database appliance 16, cache statistics module 62 may generate a historical cache-hit rate for database appliance 16.

In particular embodiments, cache statistics module 62 collects statistics on cache entries. As an example and not by way of limitation, cache statistics module 62 may track and record a number of records in cache 44. As another example, cache statistics module 62 may track and record a result-set size in each of one or more records in cache 44. As yet another example, cache statistics module 62 may track and record one or more cost factors based on response time. As yet another example, cache statistics module 62 may, using timestamps, track and record a date and time of creation of each of one or more records in cache 44 and dates and times of access of each of the entries. In particular embodiments, cache statistics module 62 collects statistics on invalidation of entries in cache 44. As an example and not by way of limitation, cache statistics module 62 may track and record invalidated entries and, using timestamps, times and dates of invalidation of invalidated entries. Although particular statistics on caching activity at caching unit 40 are described, the present invention contemplates any suitable statistics on caching activity at caching unit 40. In particular embodiments, cache statistics module 62 communicates collected cache statistics to monitoring unit 42 for storage.

Figure 5:
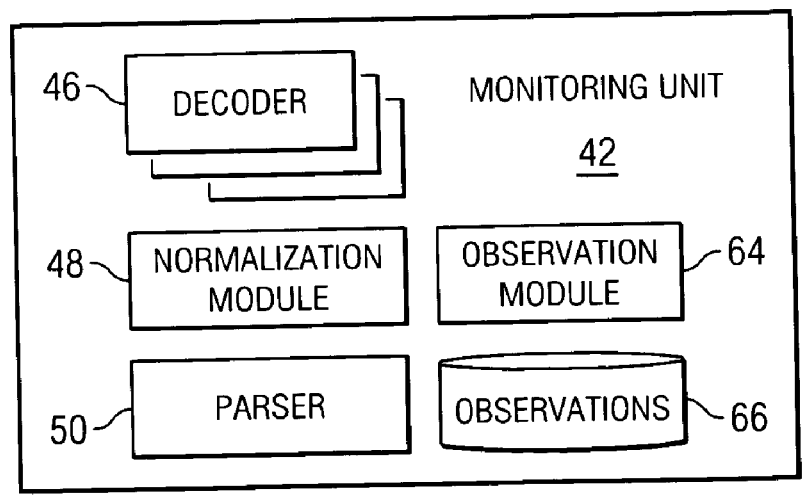
FIG. 5 illustrates an example monitoring unit of the database appliance.

FIG. 5 illustrates an example monitoring unit 42 of database appliance 16. Monitoring unit 42 includes multiple decoders 46, a normalization module 48, a parser 50, and an observation module 64. In particular embodiments, a wire in one or more circuit boards, an internal or external bus, a local area network (LAN), a metropolitan area network (MAN), a wide area network (WAN), a portion of the Internet, or other link or a combination of two or more such links couple components of monitoring unit 42 to each other. In particular embodiments, two or more components of monitoring unit 42 are logically separate from each other. In particular embodiments, two or more components of monitoring unit 42 share a hardware, software, or embedded logic component or a combination of two or more such components with each other. In particular embodiments, decoders 46 in monitoring unit 42 are similar to decoders 46 in caching unit 40 described above. In particular embodiments, normalization module 48 in monitoring unit 42 is similar to normalization module 48 in caching unit 40 described above. In particular embodiments, parser 50 in monitoring unit 42 is similar to parser 50 in caching unit 40 described above.

Observation module 64 includes a hardware, software, or embedded logic component or a combination of two or more such components that record observations 66 on contents of database messages between clients 12 and database servers 18. As an example and not by way of limitation, observation module 64 may receive from parser 50 parsed, normalized SQL statements extracted from decoded database messages, access contents of the SQL statements, and record observations 66 on the contents of the SQL statements. As another example, observation module 64 may receive the decoded database messages themselves, access contents of the database messages outside the SQL statements, and record observations 66 on the contents of the database messages. Monitoring unit 42 may provide user access to observations 66 through a statistical, historical, tabular, graphical, or other interface or a combination of two or more such interfaces.

In particular embodiments, monitoring unit 42 communicates observations 66 to one or more computer systems (such as one or more report servers) that report observations 66 to users, according to particular needs. In particular embodiments, monitoring unit 42 communicates observations 66 to one or more computer systems that take action in response to observations 66, according to particular needs. As an example and not by way of limitation, monitoring unit 42 may communicate observations 66 to a computer system maintaining a web cache. The computer system may monitor observations 66 from monitoring unit 42 and, in response to particular observations 66 from monitoring unit 42, delete particular records in the web cache. As an example and not by way of limitation, an observation 66 from monitoring unit 42 may indicate to the computer system that a client 12 recently communicated a database message to a database server 18 modifying contents of one or more web pages. In response to observation 66, the computer system maintaining the web cache may delete from the web cache outdated versions of the web pages.

In particular embodiments, observations 66 on the contents of the SQL statements, the contents of the database messages outside the SQL statements, or both include one or more of the following: (1) information regarding subject database instances of the SQL statements; (2) information regarding vendors of database implementations of the subject database instances; (3) information regarding software and versions of the software in the database implementations; (4) information regarding network protocols and versions of the network protocols used to communicate the database messages; (5) information regarding protocol drivers at database servers 18, versions of the protocol drivers, and application programming interfaces (APIs) at database servers 18 between application layers and network layers used to communicate the database messages; (6) information regarding devices (including, for example, subprocesses and, if applicable, node clusters) hosting the subject database instances of the SQL statements; (7) information regarding hostnames, IP addresses, MAC addresses, and network ports of database servers 18; (8) information regarding operating systems (OSs), versions of the OSs, and attributes of the OSs (such as, for example, patch levels) of devices hosting the subject database instances of the SQL statements; (9) information regarding protocol drivers at clients 12, versions of the protocol drivers, and APIs at clients 12 between application layers and network layers used to communicate the database messages; (10) information regarding devices (including, for example, subprocesses and, if applicable, node clusters) hosting clients 12; (11) information regarding application frameworks at clients 12; (12) information regarding hostnames, IP addresses, MAC addresses, and network ports of clients 12; and (13) information regarding OSs, versions of the OSs, and attributes of the OSs (such as, for example, patch levels) of clients 12.

In particular embodiments, observations 66 on contents of SQL statements, contents of database messages outside the SQL statements, or both include information regarding discovered database system entities (such as for example, database servers 18, database processes, cluster nodes, database instances, namespaces, tables, columns, database users, database sessions, pending operations, hostnames IP addresses, and network ports) and information regarding times and dates of discovery of the database system entities; information regarding active sessions between an observed database instance and processes at clients 12 (such as, for example, information regarding names and addresses of client hosts, information regarding the observed database instance, information regarding a name and an address of a server host, information regarding a database user, information regarding start times and elapsed durations of the sessions); information regarding a number of queries communicated from each of clients 12 to each of one or more database instances (which may include information regarding a rate at which such queries are observed over time); or a combination of such information. Although particular observations 66 on particular contents of SQL statements and particular contents of database messages outside the SQL statements are described, the present invention contemplates any suitable observations 66 on any suitable contents of SQL or other statements and any suitable contents of database messages outside the SQL or other statements.

Figure 6A:
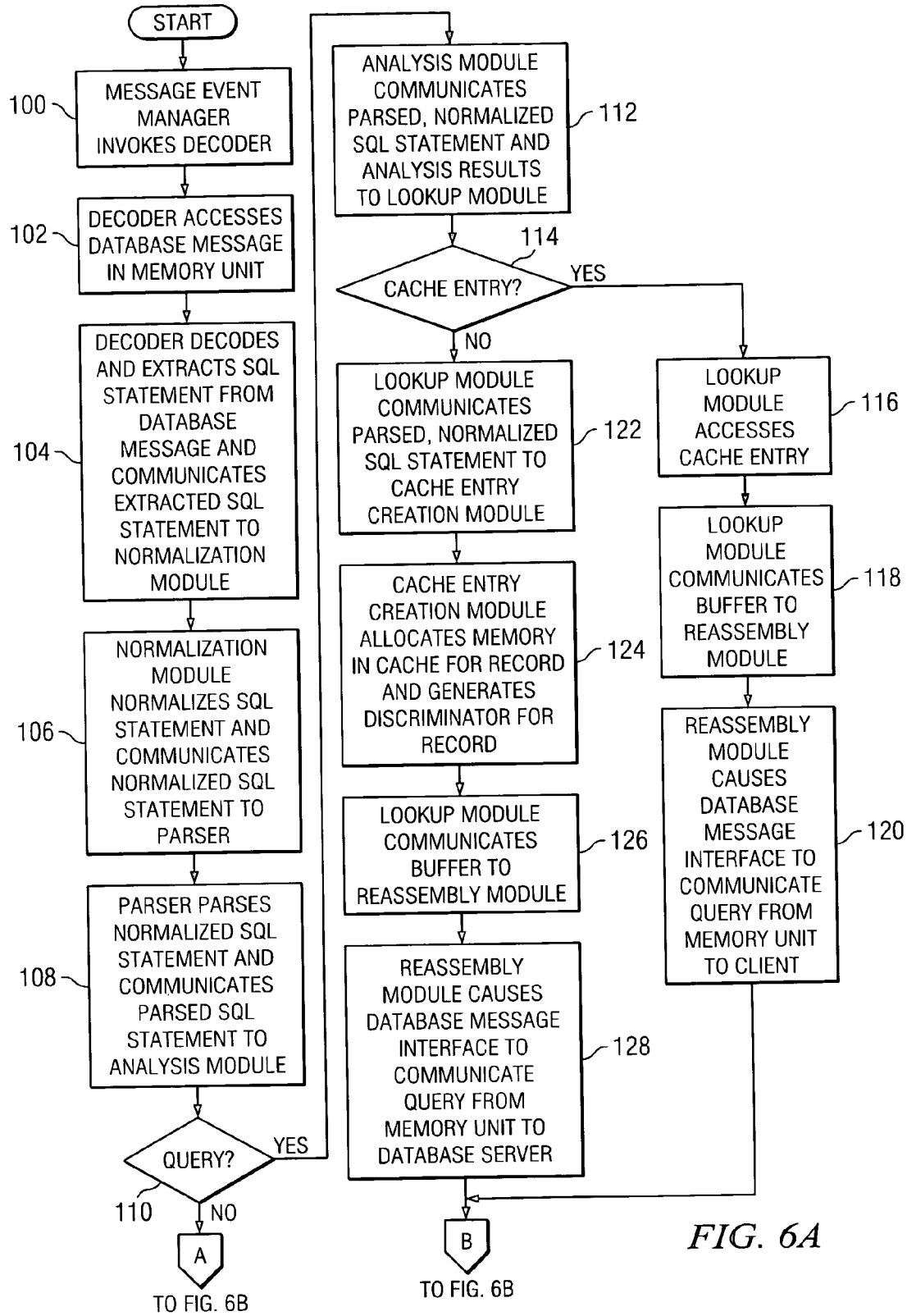
FIG. 6 illustrates an example method for application-layer query-result caching.
Figure 6B:
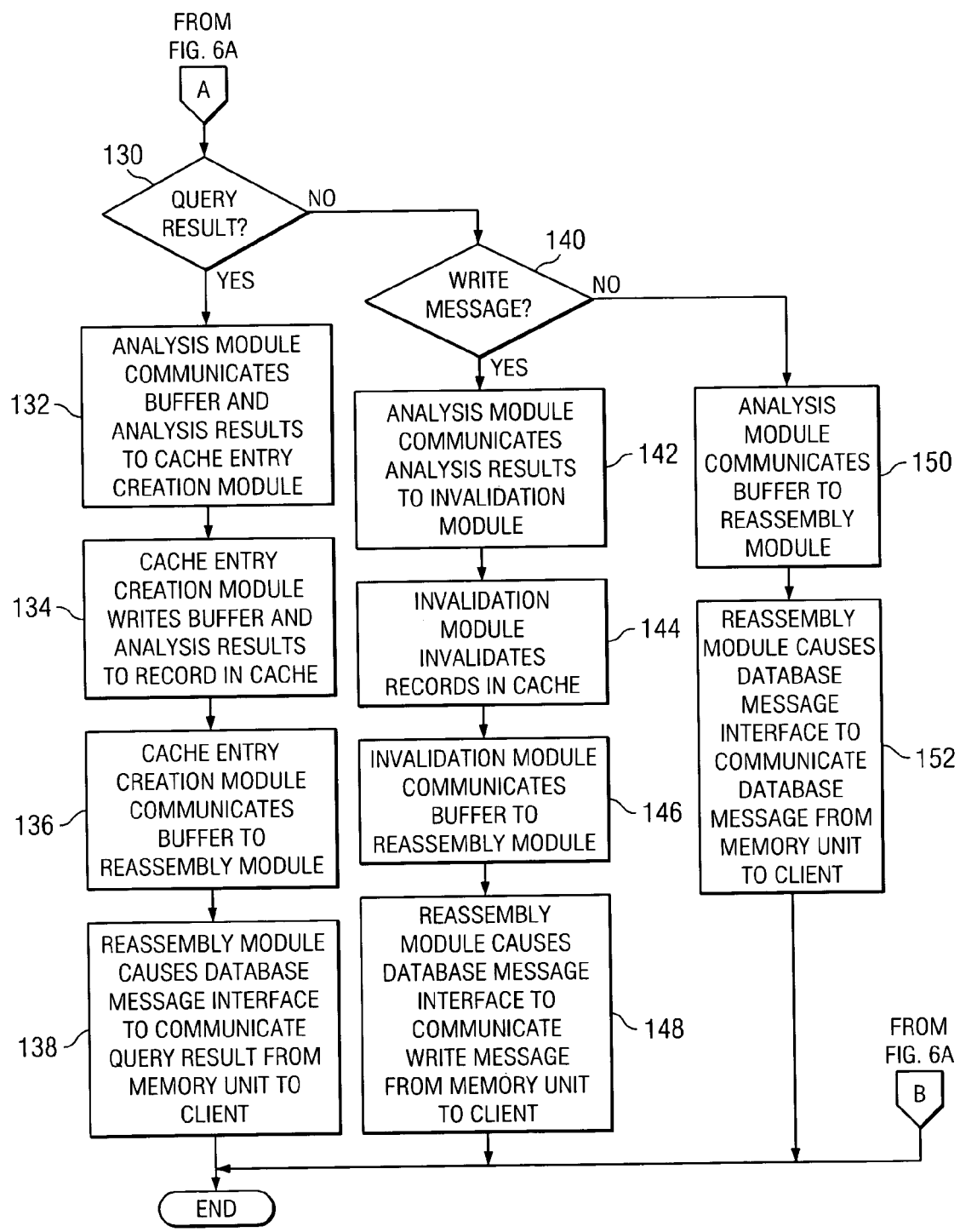

FIG. 6 illustrates an example method for application-layer query-result caching. The method begins at step 100, where, in response to database message interface 32 receiving a database message from a client 12 or a database server 18 and message memory manager 36 writing the database message to memory unit 38, message event manager 36 invokes a decoder 46 in caching unit 40 to decode and extract an SQL statement from the database message. At step 102, decoder 46 accesses the database message in memory 42. At step 104, decoder 46 decodes and extracts an SQL statement from the database message and communicates the extracted SQL statement to normalization module 48 in caching unit 40. At step 106, normalization module 48 normalizes the SQL statement and communicates the normalized SQL statement to parser 50 in caching unit 40. At step 108, parser 50 parses the normalized SQL statement and communicates the parsed, normalized SQL statement to analysis module 52.

At step 110, analysis module 52 analyzes the parsed, normalized SQL statement. If the parsed, normalized SQL statement includes a query, the method proceeds to step 112, where analysis module 52 communicates the parsed, normalized SQL statement and one or more results of analysis of the parsed, normalized SQL statement to lookup module 54 in caching unit 40. At step 114, lookup module 54 looks up a record in cache 44 including one or more query results responsive to the query. If a record in cache 44 includes one or more query results responsive to the query, the method proceeds to step 116, where lookup module 54 accesses the cache entry. At step 118, lookup module 54 communicates a buffer in the cache entry to reassembly module 56. At step 120, reassembly module 56 causes database message interface 32, according to the buffer, to communicate one or more frames including one or more database messages responsive to the query from memory unit 32 to an intended client 12, at which point the method ends.

Returning to step 114, if a record in cache 44 does not include one or more query results responsive to the query, the method proceeds to step 122, where lookup module 54 communicates the parsed, normalized SQL statement to cache entry creation module 58. At step 124, cache entry creation module 58 allocates memory in cache 44 for a record including query results responsive to the query and generates a discriminator for the record. At step 126, lookup module 54 communicates to reassembly module 56 a buffer pointing to the database message in memory unit 38 including the query. At step 128, reassembly module 56 causes database message interface 32, according to the buffer, to communicate the database message including the query from memory unit 38 to an intended database server 18, at which point the method ends.

Returning to step 110, if the parsed, normalized SQL statement does not include a query, the method proceeds to step 130. At step 130, if the parsed, normalized SQL statement includes a query result, the method proceeds to step 132. At step 132, analysis module 52 communicates a buffer pointing to the database message in memory unit 38 including the query result and one or more results of analysis of the parsed, normalized SQL statement to cache entry creation module 56. At step 134, cache entry creation module 58 writes the buffer and the analysis results to a record in cache 44. At step 136, cache entry creation module 58 communicates the buffer to reassembly module 56. At step 138, reassembly module 56 causes database message interface 32, according to the buffer, to communicate the database message including the query result from memory unit 38 to an intended client 12, at which point the method ends.

Returning to step 130, if the parsed, normalized SQL statement does not include a query result, the method proceeds to step 140. At step 140, if the parsed, normalized SQL statement includes a write message, the method proceeds to step 142. At step 142, analysis module 52 communicates one or more results of analysis of the parsed, normalized SQL statement (such as one or more results identifying a subject database instance and a subject table of the SQL statement) to invalidation module 60. At step 144, invalidation module 60 invalidates one or more records in cache 44 according to the results of analysis of the parsed, normalized SQL statement. At step 146, invalidation module 60 communicates to reassembly module 56 a buffer pointing to the database message in memory unit 38 including the write message. At step 148, reassembly module 56 causes database message interface 32, according to the buffer, to communicate the write message from memory unit 38 to an intended client 12, at which point the method ends.

Returning to step 140, if the parsed, normalized SQL statement does not include a write message, the method proceeds to step 150. At step 150, analysis module 52 communicates to reassembly module 56 a buffer pointing to the database message in memory unit 38. At step 152, reassembly module 56 causes database message interface 32 to communicate the database message from memory unit 32 to an intended client 12 or an intended database server 18. Although particular steps in the method illustrated in FIG. 6 are described and illustrated as occurring in a particular order, the present invention contemplates any suitable steps in the method illustrated in FIG. 6 occurring in any suitable order.

Figure 7:
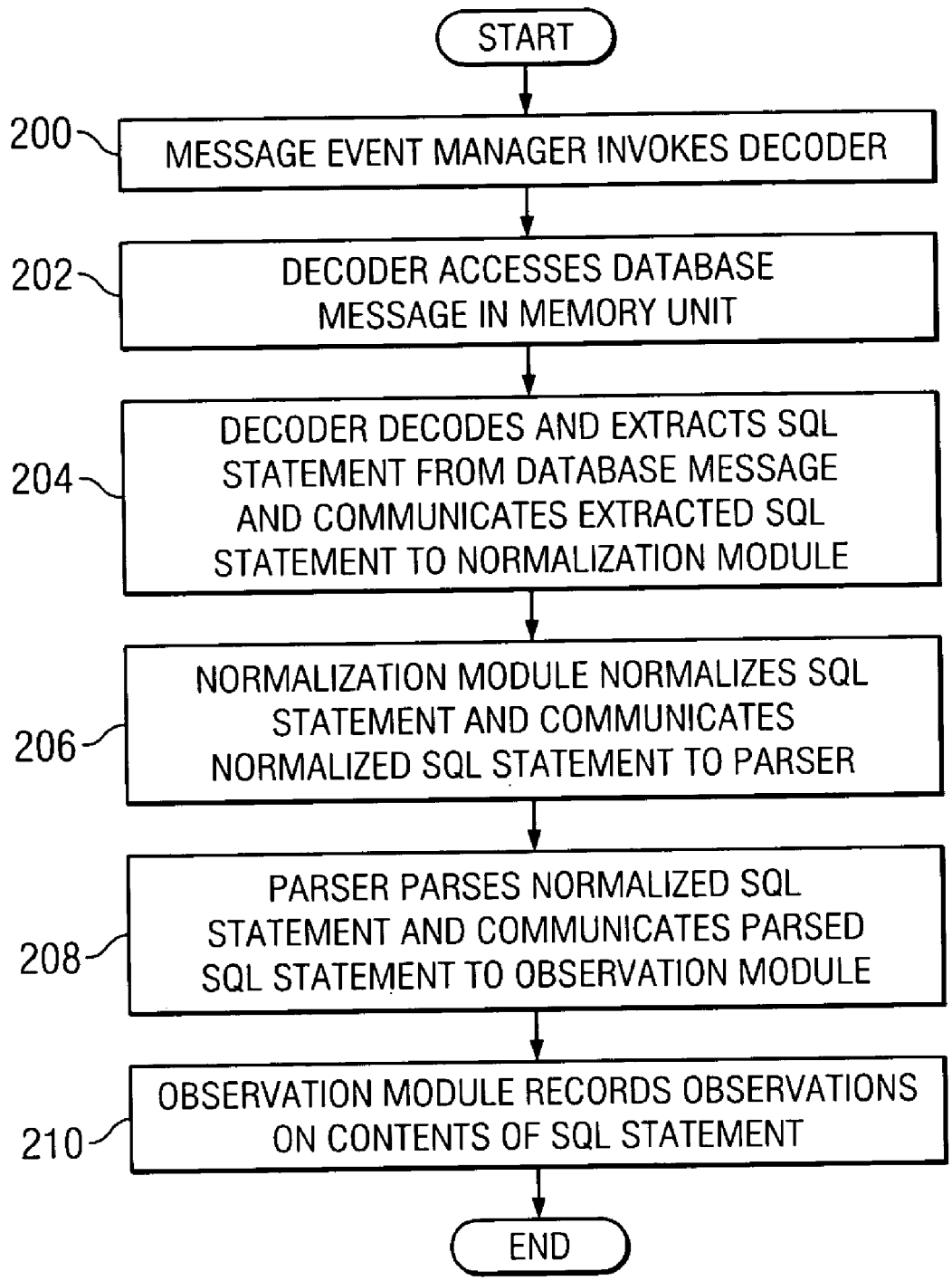
FIG. 7 illustrates an example method for application-layer monitoring of communication between one or more clients and one or more database servers.

FIG. 7 illustrates an example method for application-layer monitoring of communication between one or more clients and one or more database servers. The method begins at step 200, where, in response to database message interface 32 receiving a database message from a client 12 or a database server 18 and message memory manager 36 writing the database message to memory unit 38, message event manager 36 invokes a decoder 46 in monitoring unit 42 to decode and extract an SQL statement from the database message. At step 202, decoder 46 accesses the database message in memory 42. At step 204, decoder 46 decodes and extracts an SQL statement from the database message and communicates the extracted SQL statement to normalization module 48 in monitoring unit 42. At step 206, normalization module 48 normalizes the SQL statement and communicates the normalized SQL statement to parser 50 in monitoring unit 42. At step 208, parser 50 parses the normalized SQL statement and communicates the parsed, normalized SQL statement to observation module 64. At step 210, observation module 64 records one or more observations 66 on contents of the parsed, normalized SQL statement as described above, at which point the method ends. Although particular steps in the method illustrated in FIG. 7 are described and illustrated as occurring in a particular order, the present invention contemplates any suitable steps in the method illustrated in FIG. 7 occurring in any suitable order.

Although the present invention has been described with several embodiments, myriad changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer accessible storage hardware having thereon stored a system for providing application-layer functionality between one or more database clients and one or more database servers, the system comprising:
    one or more decoders residing at a decoding layer above a network layer, the decoders residing at a first network location between one or more database clients residing at one or more second network locations and one or more database servers residing at one or more third network locations, the decoders being operable to:
        receive database messages communicated from the database clients and intended for the database servers and database messages communicated from the database servers and intended for the database clients;
        decode the database messages;
        extract query-language statements from the database messages;
    a caching application residing at an application layer above the decoding layer, the caching application residing at the first network location, the caching application being operable to:
        receive query-language statements extracted at the decoders comprising queries;
        receive query-language statements extracted at the decoders comprising query results corresponding to the queries;
        record the queries and the query results corresponding to the queries in a cache residing at the first network location wherein the queries are associated with a corresponding query result;
    a monitoring application operable to receive query-language statements extracted at the decoders and record observations on the database messages based at least in part on the query-language statements extracted at the decoders, wherein at least one observation is associated with a query result stored in the cache and communicate one or more observations associated with the queries to one or more computing systems at a fourth network location according to the needs of the one or more computer systems, wherein at least one of the computer systems maintains a web cache and is operable to modify the web cache based upon the communicated observations wherein observations on the database messages based at least in part on the query-language statement extracted at the decoders comprise the following:
        subject database instances of the query-language statements;
        network protocols and versions of the network protocols used to communicate the database messages;
        devices hosting the subject database instances of the query-language statements;
        hostnames, Internet Protocol (IP) addresses, Media Access Control (MAC) addresses, and network ports of the database servers;

operating systems (OSs), versions of the OSs, and attributes of the OSs of devices hosting the subject database instances;

devices hosting the clients; and a number of queries communicated from each of the clients to each of one or more database instances; and an application residing at an application layer above the decoding layer, the application residing at the first network location, the application being operable to receive and process query-language statements extracted at the decoders.

2. The computer accessible storage hardware of claim 1, wherein the caching application is further operable to communicate query results corresponding to the queries from the cache to the clients.

3. The computer accessible storage hardware of claim 1, wherein the caching application is further operable to:

receive query-language statements extracted at the decoders comprising write messages; and invalidate records of queries and query results corresponding to the queries according to the write messages.

4. The computer accessible storage hardware of claim 1 wherein the monitoring application is further operable to provide user access to recorded observations based at least in part on the query-language statements extracted at the decoders using a graphical user interface (GUI) comprising at least one or more of:

a statistical display of recorded observations;

a historical display of recorded observations; and a tabular display of recorded observations.

5. The computer accessible storage hardware of claim 1, wherein a single nonblocking control thread drives the decoders and the application according to message events in an event queue.

6. The computer accessible storage hardware of claim 5, wherein, to drive the decoders, the nonblocking control thread communicates function calls to the decoders comprising buffers pointing to frames of database messages in memory at the first network location without communicating the frames of the database messages to the decoders or assembling the database messages and communicating the database messages to the decoders.

7. The computer accessible storage hardware of claim 1, wherein the decoders are each operable to decode particular database messages of particular database implementations different from each other.

8. The computer accessible storage hardware of claim 7, wherein the decoders comprise at least: a first decoder operable to decode Distributed Relational Database Architecture (DRDA) database messages;

a second decoder operable to decode Tabular Data Stream (TDS) database messages; and a third decoder operable to decode OracleNet database messages.

9. The computer accessible storage hardware of claim 1, further comprising a database message interface residing at the network layer and at the first network location, the database message interface being operable to:

receive frames of database messages from the clients and the database servers and write the frames to memory at the first network location for processing at the decoders; and communicate frames of database messages from memory at the first network location to the clients and the database servers without assembling the frames.

10. The computer accessible storage hardware of claim 1, further comprising a normalization module residing at a query-language layer above the decoding layer, the normalization module being operable to receive query-language statements extracted at the decoders and, before the application receives the query-language statements, normalize the query-language statements for processing at the application.

11. The computer accessible storage hardware of claim 10, wherein normalizing a query-language statement comprises one or more of:

capitalizing all letters in the query-language statement;

reordering terms in the query-language statement according to a predetermined order; and modifying one or more clauses in the query-language statement according to a predetermined clause equivalency.

12. The computer accessible storage hardware of claim 1, further comprising a parser residing at a query language layer above the decoding layer, the parser being operable to receive query-language statements extracted at the decoders and, before the application receives the query-language statements, parse the query-language statements for processing at the application.

13. The computer accessible storage hardware of claim 1, wherein the network layer comprises a Transport Control Protocol over Internet Protocol (TCP/IP) interface or an Interprocess Communication (IPC) interface.

14. The computer accessible storage hardware of claim 1, wherein at least some of the query-language statements are Structured Query Language (SQL) statements.

15. A computer accessible storage hardware having thereon stored computer-executable instructions for implementing the method of:

at a decoding layer above a network layer at a first network location between one or more database clients residing at one or more second network locations and one or more database servers residing at one or more third network locations:

receiving database messages communicated from the database clients and intended for the database servers and database messages communicated from the database servers and intended for the database clients;

decoding the database messages; and extracting query-language statements from the database messages;

at an application layer above the decoding layer, a caching application operable for:

receiving query-language statements extracted at the decoders comprising queries;

receiving query-language statements extracted at the decoders comprising query results corresponding to the queries; and recording the queries and the query results corresponding to the queries in a cache residing at the first network location wherein the queries are associated with a corresponding query result;

and a monitoring application operable to receive query-language statements extracted at the decoders and record observations on the database messages based at least in part on the query-language statements extracted at the decoders, wherein at least one observation is associated with a query result stored in the cache and communicate one or more observations associated with the queries to one or more computing systems at a fourth network location according to the needs of the one or more computer systems, wherein at least one of the computer systems maintains a web cache and is operable to modify the web cache based upon the communicated observations wherein observations on the database messages based at least in part on the query-language statement extracted at the decoders comprise the following:
  subject database instances of the query-language statements;
  network protocols and versions of the network protocols used to communicate the database messages;
  devices hosting the subject database instances of the query-language statements;
  hostnames, Internet Protocol (IP) addresses, Media Access Control (MAC) addresses, and network ports of the database servers;
  operating systems (OSs), versions of the OSs, and attributes of the OSs of devices hosting the subject database instances;
  devices hosting the clients; and
  a number of queries communicated from each of the clients to each of one or more database instances;
and
at an application layer above the decoding layer at the first network location, receiving and processing query-language statements extracted at the decoding layer; and
  at the application layer, communicating query results corresponding to the queries to the clients.

16. The computer accessible storage hardware of claim 15, further comprising, at the application layer:
  receiving query-language statements extracted at the decoders comprising write messages; and
  invalidating records of queries and query results corresponding to the queries according to the write messages.

17. The computer accessible storage hardware of claim 15, further comprising, at the application layer, providing user access to recorded observations based at least in part on the query-language statements extracted at the decoding layer using a graphical user interface (GUI) comprising at least one or more of:
  a statistical display of recorded observations;
  a historical display of recorded observations; and
  a tabular display of recorded observations.

18. The computer accessible storage hardware of claim 15, wherein a single nonblocking control thread drives the decoding layer and the application layer according to message events in an event queue.

19. The computer accessible storage hardware of claim 18, wherein, to drive the decoding layer, the nonblocking control thread communicates function calls to the decoding layer comprising buffers pointing to frames of database messages in memory at the first network location without communicating the frames of the database messages to the decoding layer or assembling the database messages and communicating the database messages to the decoding layer.

20. The computer accessible storage hardware of claim 15, wherein decoding database messages comprises decoding database messages of database implementations different from each other.

21. The computer accessible storage hardware of claim 20, wherein decoding database messages comprises decoding Distributed Relational Database Architecture (DRDA) database messages, Tabular Data Stream (TDS) database messages, and OracleNet database messages.

22. The computer accessible storage hardware of claim 15, further comprising, at the network layer at the first network location:
  receiving frames of database messages from the clients and the database servers and writing the frames to memory at the first network location for processing at the decoding layer; and
  communicating frames of database messages from memory at the first network location to the clients and the database servers without assembling the frames.

23. The computer accessible storage hardware of claim 15, further comprising, at a query-language layer above the decoding layer at the first network location, receiving query-language statements extracted at the decoding layer and, before the application receives the query-language statements, normalizing the query-language statements for processing at the application.

24. The computer accessible storage hardware of claim 23, wherein normalizing a query-language statement comprises one or more of:
  capitalizing all letters in the query-language statement;
  reordering terms in the query-language statement according to a predetermined order; and
  modifying one or more clauses in the query-language statement according to a predetermined clause equivalency.

25. The computer accessible storage hardware of claim 15, further comprising, at a query-language layer above the decoding layer at the first network location, receiving query-language statements extracted at the decoding layer and, before the application layer receives the query-language statements, parsing the query-language statements for processing at the application layer.

26. The computer accessible storage hardware of claim 15, wherein the network layer comprises a Transport Control Protocol over Internet Protocol (TCP/IP) interface or an Interprocess Communication (IPC) interface.

27. The computer accessible storage hardware of claim 15, wherein at least some of the query-language statements are Structured Query Language (SQL) statements.

28. A computer accessible storage hardware having stored thereon computer-executable instructions for providing application layer functionality between one or more database clients and one or more database servers, the computer executable instructions operable to:
  at a decoding layer above a network layer at a first network location between one or more database clients residing at one or more second network locations and one or more database servers residing at one or more third network locations:
  receive database messages communicated from the database clients and intended for the database servers and database messages communicated from the database servers and intended for the database clients;
  decode the database messages; extract query-language statements from the database messages; at a decoding layer above a network layer at a first network location between one or more database clients residing at one or more second network locations and one or more database servers residing at one or more third network locations:
  receiving database messages communicated from the database clients and intended for the database servers and database messages communicated from the database servers and intended for the database clients;
  decoding the database messages; and
  extracting query-language statements from the database messages;
  at an application layer above the decoding layer, a caching application operable for:
  receiving query-language statements extracted at the decoders comprising queries;
  receiving query-language statements extracted at the decoders comprising query results corresponding to the queries; and recording the queries and the query results corresponding to the queries in a cache residing at the first network location wherein the queries are associated with a corresponding query result;

and a monitoring application operable to receive query-language statements extracted at the decoders and record observations on the database messages based at least in part on the query-language statements extracted at the decoders, wherein at least one observation is associated with a query result stored in the cache and communicate one or more observations associated with the queries to one or more computing systems at a fourth network location according to the needs of the one or more computer systems, wherein at least one of the computer systems maintains a web cache and is operable to modify the web cache based upon the communicated observations wherein observations on the database messages based at least in part on the query-language statement extracted at the decoders comprise the following:

subject database instances of the query-language statements;

network protocols and versions of the network protocols used to communicate the database messages;

devices hosting the subject database instances of the query-language statements;

hostnames, Internet Protocol (IP) addresses, Media Access Control (MAC) addresses, and network ports of the database servers;

operating systems (OSs), versions of the OSs, and attributes of the OSs of devices hosting the subject database instances;

devices hosting the clients; and a number of queries communicated from each of the clients to each of one or more database instances;

and at an application layer above the decoding layer at the first network location, process the query-language statements extracted at the decoding layer.

29. The computer accessible storage hardware of claim 28, wherein the instructions are further operable, at the application layer, to communicate query results corresponding to the queries from the cache to the clients.

30. The computer accessible storage hardware of claim 28, wherein the instructions are further operable, at the application layer, to:

receive query-language statements extracted at the decoders comprising write messages; invalidate records of queries and query results corresponding to the queries according to the write messages; and communicate the write messages to the one or more clients.

31. The computer accessible storage hardware of claim 28, wherein the instructions are further operable, at the application layer, to provide user access to recorded observations based at least in part on the query-language statements extracted at the decoding layer using a graphical user interface (GUI) comprising at least one or more of:

a statistical display of recorded observations;

a historical display of recorded observations; and a tabular display of recorded observations.

32. The computer accessible storage hardware of claim 28, wherein a single nonblocking control thread drives the decoding layer and the application layer according to message events in an event queue.

33. The computer accessible storage hardware of claim 32, wherein, to drive the decoding layer, the nonblocking control thread communicates function calls to the decoding layer comprising buffers pointing to frames of database messages in memory at the first network location without communicating the frames of the database messages to the decoding layer or assembling the database messages and communicating the database messages to the decoding layer.

34. The computer accessible storage hardware of claim 28, wherein the instructions are operable, at the decoding layer, to decode database messages of database implementations different from each other.

35. The computer accessible storage hardware of claim 34, wherein the instructions are operable, at the decoding layer, to decode Distributed Relational Database Architecture (DRDA) database messages, Tabular Data Stream (TDS) database messages, and OracleNet database messages.

36. The computer accessible storage hardware of claim 28, wherein the instructions are further operable, at the network layer at the first network location, to:

receive frames of database messages from the clients and the database servers and write the frames to memory at the first network location for processing at the decoding layer, and communicate frames of database messages from memory at the first network location to the clients and the database servers without assembling the frames.

37. The computer accessible storage hardware of claim 28, wherein the instructions are further operable, at a query-language layer above the decoding layer at the first network location, to receive query-language statements extracted at the decoding layer and, before the application receives the query-language statements, normalize the query-language statements for processing at the application.

38. The computer accessible storage hardware of claim 37, wherein normalizing a query-language statement comprises one or more of:

capitalizing all letters in the query-language statement;

reordering terms in the query-language statement according to a predetermined order; and modifying one or more clauses in the query-language statement according to a predetermined clause equivalency.

39. The computer accessible storage hardware of claim 28, wherein the instructions are further operable, at a query-language layer above the decoding layer at the first network location, to receive query-language statements extracted at the decoding layer and, before the application layer receives the query-language statements, parse the query-language statements for processing at the application layer.

40. The computer accessible storage hardware of claim 28, wherein the network layer comprises a Transport Control Protocol over Internet Protocol (TCP/IP) interface or an Interprocess Communication (IPC) interface.

41. The computer accessible storage hardware of claim 28, wherein at least some of the query-language statements are Structured Query Language (SQL) statements.

* * * * *